US010234011B2

(12) United States Patent
Meffert et al.

(10) Patent No.: US 10,234,011 B2
(45) Date of Patent: Mar. 19, 2019

(54) SPUR GEAR

(71) Applicant: Dr. Ing. h.c. F. Porsche Aktiengesellschaft, Stuttgart (DE)

(72) Inventors: Peter Meffert, Tiefenbronn (DE); Falk Heilfort, Eberdingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 342 days.

(21) Appl. No.: 15/183,283

(22) Filed: Jun. 15, 2016

(65) Prior Publication Data

US 2016/0369882 A1 Dec. 22, 2016

(30) Foreign Application Priority Data

Jun. 19, 2015 (DE) ........................ 10 2015 109 870

(51) Int. Cl.
*F16H 55/17* (2006.01)
*F16H 1/08* (2006.01)

(52) U.S. Cl.
CPC ............... *F16H 55/17* (2013.01); *F16H 1/08* (2013.01)

(58) Field of Classification Search
USPC ........................................................... 74/655
See application file for complete search history.

(56) References Cited

U.S. PATENT DOCUMENTS 2,067,477 A * 1/1937 Cooper .................... F16H 55/08 74/466
4,938,088 A * 7/1990 Langley .................. F16H 61/32 192/109 A
8,720,306 B2 5/2014 McCune et al.
2009/0062058 A1* 3/2009 Kimes ....................... F16H 1/28 475/344

(Continued)

FOREIGN PATENT DOCUMENTS

DE 19951400 5/2001
DE 102008035155 A1 3/2009

(Continued)

OTHER PUBLICATIONS

Japanese Office Action with English language translation for Application No. 2016-120350, dated Mar. 8, 2017, 7 pages.

(Continued)

*Primary Examiner* — William Kelleher
*Assistant Examiner* — Gregory Robert Weber
(74) *Attorney, Agent, or Firm* — RatnerPrestia

(57) ABSTRACT

A spur gear for transmitting a drive torque in a toothing of a motor vehicle transmission is provided, having a helically toothed first gear body for forming first teeth, a second gear body, which is helically toothed oppositely to the first gear body so as to form a herringbone toothing, for forming second teeth, wherein, on axial sides which face toward one another of the first gear body and of the second gear body, the first teeth and the second teeth point toward one another, so as to at least partially overlap one another, in each case (Continued)

pairwise, wherein, on that axial side of the first gear body which points toward the second gear body, a first tooth flank of the first tooth points in an axial direction toward a second tooth flank of a second tooth which follows the opposite second tooth in a circumferential direction.

13 Claims, 4 Drawing Sheets

(56) References Cited

U.S. PATENT DOCUMENTS

| | | | | |
|---|---|---|---|---|
| 2009/0165585 | A1* | 7/2009 | Zhuravlev ............... | F16H 55/08 74/462 |
| 2013/0192264 | A1 | 8/2013 | McCune et al. | |
| 2014/0155219 | A1* | 6/2014 | McCune ................. | F01D 15/12 475/331 |

FOREIGN PATENT DOCUMENTS

| | | | | |
|---|---|---|---|---|
| DE | 102010027300 | | 1/2012 | |
| DE | 102010027300 | A1 * | 1/2012 | ................ B23F 7/00 |
| GB | 2452381 | A | 3/2009 | |
| JP | 2009052743 | A | 3/2009 | |
| JP | 2015508136 | A | 3/2015 | |

OTHER PUBLICATIONS

German Search Report for German Application No. 10 2015 109 870.9, dated Feb. 23, 2016 with partial translation.

* cited by examiner

SPUR GEAR

CROSS-REFERENCE TO RELATED APPLICATIONS

This application claims priority to German Patent Application No. 10 2015 109 870.9, filed Jun. 19, 2015, which is incorporated by reference herein in its entirety.

FIELD OF THE INVENTION

The invention relates to a spur gear, by means of which a drive torque for the drive of a motor vehicle can be transmitted in a toothing of a motor vehicle transmission.

BACKGROUND OF THE INVENTION

DE 10 2010 027 300 A1, which is incorporated by reference herein, has disclosed a spur gear with herringbone toothing with two oppositely helically toothed gear bodies, in the case of which the gear bodies have a rotational offset relative to one another such that, at those axial sides of the gear bodies which point toward one another, a tooth of one gear body is arranged centrally with respect to a tooth space of the other gear body.

There is a constant demand for designing motor vehicle transmissions to be as small and quiet as possible. Furthermore, it is sought to achieve good overall efficiency.

SUMMARY OF THE INVENTION

It is an object of the invention to specify measures which make it possible to realize a quiet motor vehicle transmission with a small structural space requirement. In particular, it is an object of the invention to reduce the internal forces of the motor vehicle transmission and/or achieve a high overall efficiency. The object is achieved by way of the spur gear described hereinafter.

According to aspects of the invention, a spur gear for transmitting a drive torque in a toothing of a motor vehicle transmission is provided, having a helically toothed first gear body for forming first teeth, a second gear body, which is helically toothed oppositely to the first gear body so as to form a herringbone toothing, for forming second teeth, wherein, on axial sides which face toward one another of the first gear body and of the second gear body, the first teeth and the second teeth point toward one another, so as to at least partially overlap one another, in each case pairwise, wherein, on that axial side of the first gear body which points toward the second gear body, a first tooth flank of the first tooth points in an axial direction toward a second tooth flank of a second tooth which follows the opposite second tooth in a circumferential direction.

The mutually oppositely situated teeth of the first gear body and of the second gear body are those teeth whose axial sides which point toward one another have the greatest overlap in terms of area. For a given helix angle, at least the second tooth extends with its component in the circumferential direction to such an extent that, for a given pitch of the second teeth, the second tooth already begins in the circumferential direction when the first tooth ends. An imaginary elongation of the first tooth flank in an axial direction intersects at least the edge of the second tooth flank of the following second tooth. It can be ensured in this way that, at a time at which the first tooth in a toothing passes out of engagement, the following second tooth is already in engagement or is just entering into engagement. In this way, it is always the case that at least one of the first teeth or one of the second teeth is in engagement, whereby an interruption of the torque transmission is avoided, and transmission noise can be kept low. Here, it is even possible for the width of the first gear body and/or of the second gear body to be selected to be so small that a following tooth of a gear body does not yet enter into engagement when the preceding tooth passes out of engagement, because in this case, at least one tooth of the respective other gear body is in engagement. The axial extent of at least one of the gear bodies can thereby be particularly small, such that the axial structural space requirement of the spur gear can be reduced. Since the following second tooth already enters into engagement when the first tooth of the preceding tooth pairing passes out of engagement, the axial extent of at least one gear body can be reduced without the need to accept significant additional toothing noise, such that it is made possible to realize a quiet motor vehicle transmission with a small structural space requirement. Furthermore, in this way, the internal forces of the motor vehicle transmission can be reduced, and a high overall efficiency of the motor vehicle transmission can be achieved.

By virtue of the gear bodies being arranged so as to form a herringbone toothing, the transmission efficiency can be increased. Furthermore, shaft bearing forces can be reduced, and tilting moment loads on a floating gear bearing of a floating gear that meshes with the spur gear can be eliminated. By contrast to a purely helically toothed spur gear, it is possible for bending of the gear bodies to be eliminated, whereby it is made possible for the web thickness of a web of the gear body to be reduced, because substantially only circumferential forces and radial forces act on the web. Furthermore, the load distribution over the tooth width can be improved. By way of the herringbone toothing, a floating gear which meshes with the spur gear can be automatically centred, giving rise to a substantially even load distribution across the two gear bodies. Furthermore, a greater helix angle for the first tooth and/or for the second tooth is possible. Owing to the reduced deformations of the gear body, it is likewise possible for noise emissions to be eliminated, giving rise to improved acoustics.

In particular, a face advance $U_1$ of the first tooth and a face advance $U_2$ of the following second tooth overlap over a distance ε in a circumferential direction, where $0.00 \leq \varepsilon/U_2 \leq 0.20$, in particular $0.01 \leq \varepsilon/U_2 \leq 0.10$, preferably $0.02 \leq \varepsilon/U_2 \leq 0.05$ and particularly preferably $0.03 \leq \varepsilon/U_2 \leq 0.04$. The face advance is the extent of a tooth flank of a helical tooth in a circumferential direction at the radial height of the pitch circle diameter, also referred to as working circle diameter. The distance ε is likewise defined in the circumferential direction at the radial height of the pitch circle diameter. The distance ε can thus be very short, whereby a particularly short axial extent of the at least one gear body is possible. It is however also possible for the distance ε to be dimensioned with a certain safety factor such that, taking into consideration production and position tolerances and further tolerances that may have to be taken into consideration, it can be ensured that the following second tooth enters into engagement when the first tooth passes out of engagement. An unduly great distance ε can be avoided, such that an unduly great width of the respective gear body in an axial direction is avoided.

The first gear body and/or the second gear body preferably has a face contact ratio $\varepsilon_\beta$ of $\varepsilon_\beta \leq 1.00$, in particular $0.50 \leq \varepsilon_\beta < 1.00$, preferably $0.75 \leq \varepsilon_\beta \leq 0.99$, more preferably $0.85 \leq \varepsilon_\beta \leq 0.98$ and particularly preferably $0.95 \leq \varepsilon_\beta \leq 0.97$. The face contact ratio is the ratio of the face advance of the respective teeth to the pitch thereof at the radial height of the pitch circle diameter. Since the following second tooth already enters into engagement when the first tooth passes out of engagement, it is even possible for the respective gear body to have a face contact ratio of less than 1.00, at which, during the rolling movement of the gear body, it is temporarily the case that no tooth is in engagement. In this situation, the transmission of torque can take place via the respective other gear body. Despite a face contact ratio of less than 1.00, it is possible for chattering and rattling noises of the teeth to be avoided.

It is particularly preferable if the first gear body and the second gear body are offset relative to one another in the circumferential direction, wherein, at those axial sides of the first gear body and of the second gear body which point toward one another, the first teeth and the second teeth overlap one another only partially. Those axial sides of the first tooth and of the second tooth which point toward one another are not oriented toward one another in fully overlapping fashion, but rather are positioned so as to have a rotational offset relative to one another in a circumferential direction. In this way, it is possible in the case of an even smaller width of the at least one gear body to achieve that the following second tooth enters into engagement when the first tooth passes out of engagement. Furthermore, it is possible to achieve an increased tooth contact overlap compared to a herringbone toothing without a mutual offset.

It is provided in particular that, at those axial sides of the first gear body and of the second gear body which point toward one another, a first tooth flank of the first tooth is offset in the circumferential direction by $V_U$ with respect to a second tooth flank of the oppositely situated, partially overlapped second tooth, wherein, in the case of a maximum tooth thickness S in the circumferential direction of the first tooth and of the second tooth, the following applies: $0.00<V_U/S<1.00$, in particular $0.25\leq V_U/S\leq 0.98$, preferably $0.50\leq V_U/S\leq 0.95$, more preferably $0.75\leq V_U/S\leq 0.90$ and particularly preferably $0.80\leq V_U/S\leq 0.85$. The first tooth flank and the second tooth flank point in each case in the same circumferential direction. The maximum tooth thickness is normally situated in the vicinity of the tooth root, at a smaller diameter than the pitch circle diameter. In the case of such an offset, at least a part of the face sides of those axial sides of the teeth which point toward one another remains in overlap.

It preferably provided that, at those axial sides of the first gear body and of the second gear body which point toward one another, a first tooth flank of the first tooth is offset in the circumferential direction by $V_U$ with respect to a second tooth flank of the oppositely situated, partially overlapped second tooth, wherein, in the case of a tooth thickness s in the circumferential direction of the first tooth and of the second tooth at the radial height of the pitch circle diameter, the following applies: $0.00\leq V_U/s\leq 1.00$, in particular $0.25\leq V_U/s\leq 0.98$, preferably $0.50\leq V_U/s\leq 0.95$, more preferably $0.75\leq V_U/s\leq 0.90$ and particularly preferably $0.80\leq V_U/s\leq 0.85$. The first tooth flank and the second tooth flank point in each case in the same circumferential direction. The tooth thickness is situated at the radial height of the pitch circle diameter. In the case of such an offset, at least a part of the face sides of those axial sides of the teeth which point toward one another remains in overlap at the radial height of the pitch circle diameter.

It is particularly preferably provided that the first teeth have a first helix angle and the second teeth have a second helix angle, wherein the magnitude of the first helix angle differs from the magnitude of the second helix angle. By way of the different helix angles, expected additional axial forces can be allowed for and compensated.

The first tooth preferably has a first toothing width, and the second tooth preferably has a second toothing width which differs from the first toothing width. By way of the different toothing widths of the first teeth in relation to the second teeth, expected additional axial forces can be allowed for and compensated.

In particular, a hub for the mounting of the spur gear is provided, wherein the first gear body and the second gear body are connected fixedly in terms of motion to the hub. In particular, the first gear body and/or the second gear body may in each case be composed of only the crown and the teeth, whereas the web for the respective gear body is formed by the hub. The first gear body and/or the second gear body is for example fixedly connected to the hub by way of a positively locking connection, for example a toothing, and/or by way of a cohesive connection, for example a welded connection. In this way, it is possible in particular to use the same hub for different gear stages of a motor vehicle transmission, and, for the respective gear stage to be formed, to merely connect to the hub the gear body provided for said gear stage. The production costs can thereby be kept low.

The invention also relates to a gear stage for a motor vehicle transmission, having a spur gear which may be designed and refined as described above, and having a floating gear which meshes with the spur gear, wherein the floating gear is mounted so as to be displaceable in an axial direction. Since the following second tooth of the spur gear already enters into engagement when the first tooth of the preceding tooth pairing passes out of engagement, the axial extent of at least one gear body can be reduced without the need to accept significant additional toothing noise, such that it is made possible to realize a quiet motor vehicle transmission with a small structural space requirement.

The invention also relates to a motor vehicle transmission for the engagement of vehicle gear speeds, having at least one gear stage, which may be designed and refined as described above, for the engagement of a vehicle gear speed assigned to the gear stage. Since the following second tooth of the spur gear of the gear stage already enters into engagement when the first tooth of the preceding tooth pairing passes out of engagement, the axial extent of at least one gear body can be reduced without the need to accept significant additional toothing noise, such that it is made possible to realize a quiet motor vehicle transmission with a small structural space requirement.

BRIEF DESCRIPTION OF THE DRAWINGS

Below, the invention will be discussed by way of example with reference to the appended drawings and on the basis of preferred exemplary embodiments, wherein the features presented below may in each case individually or combinatively constitute an aspect of the invention. In the drawings.

DETAILED DESCRIPTION OF THE INVENTION

Figure 1:
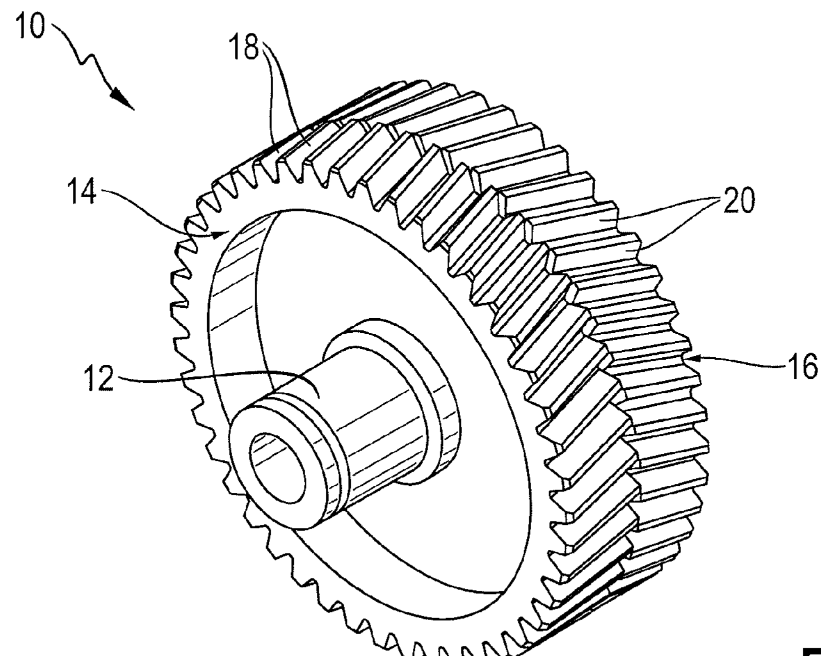
FIG. 1 shows a schematic perspective view of a spur gear.
Figure 2:
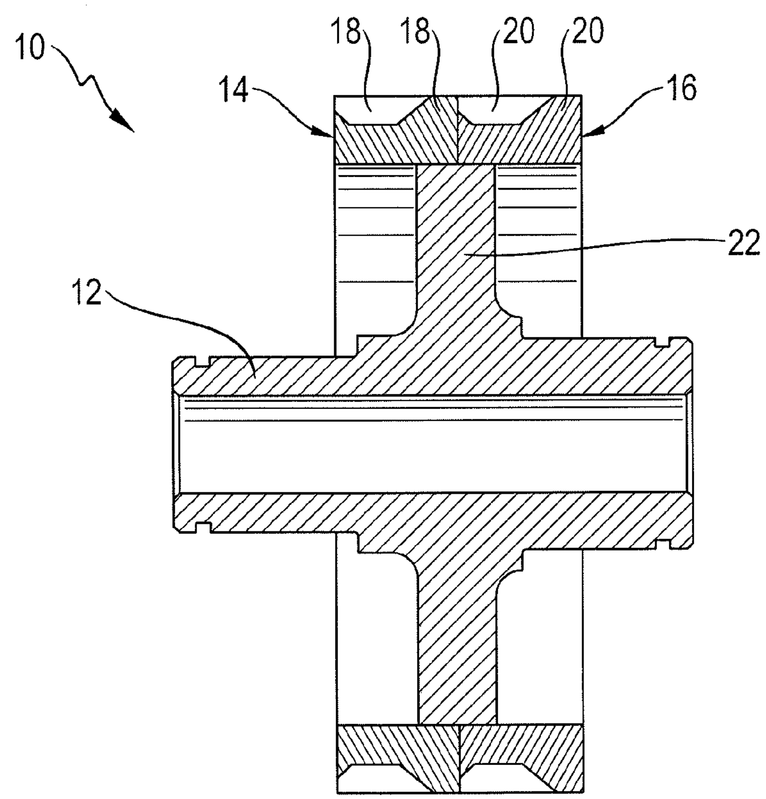
FIG. 2 shows a schematic sectional view of the spur gear from FIG. 1.

The spur gear 10 illustrated in FIG. 1 and FIG. 2 has a hub 12 to which a first gear body 14 and a second gear body 16 are fixedly connected. The first gear body 14 has helical first teeth 18, whereas the second gear body 16 has oppositely helical second teeth 20, giving rise to a herringbone toothing of the spur gear 10. The hub 12 forms a common web 22 for the gear bodies 14, 16.

Figure 3:
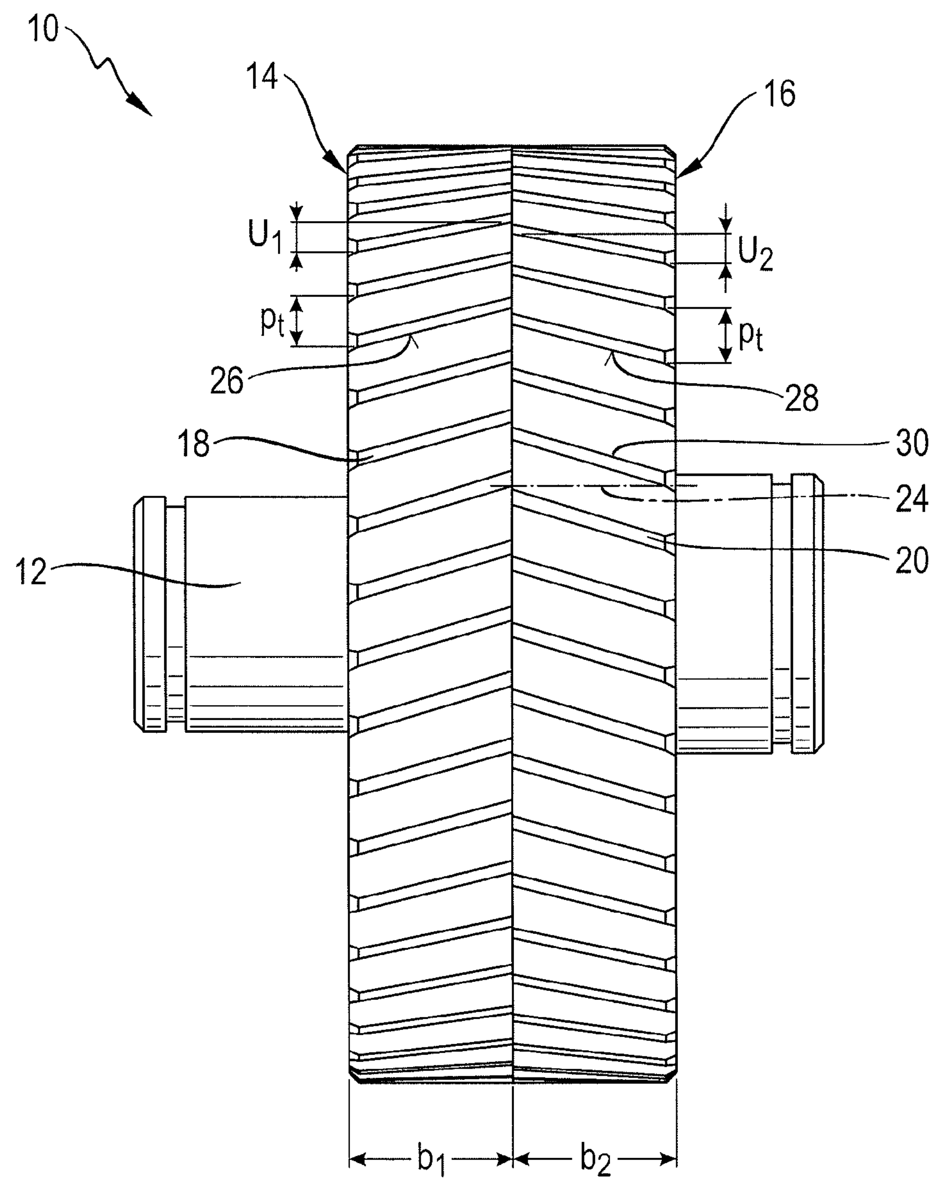
FIG. 3 shows a schematic plan view of the spur gear from FIG. 1.

As illustrated in FIG. 3, the first gear body 14 and the second gear body 16 have a rotational offset relative to one another, and are thus offset relative to one another in a circumferential direction such that those axial sides of the first teeth 18 and of the second teeth 20 which point toward one another overlap not fully but only partially as viewed in an axial direction. In this case, in the case of a very small width $b_1$ of the first gear body 14 and a very small width $b_2$ of the second gear body 16, it can be achieved that an imaginary elongation 24 of a first tooth flank 26 of the first tooth 18 at that axial side of the first tooth 18 which points toward the second gear body 16 substantially exactly intersects the edge of a second tooth flank 28 of the second tooth 20 at the axial side, pointing away from the first gear body 14, of a second tooth 30 which follows the opposite second tooth 20. It can thereby be ensured that the following second tooth 30 enters into engagement when the first tooth 18 passes out of engagement. It is thereby even possible to realize continuous toothing engagement with a meshing floating gear if the first face advance $U_1$ of the first gear body 14 and the second face advance $U_2$ of the second gear body 16 is less than one pitch $p_t$, giving rise to a face contact ratio of less than 1.00 for the respective gear body 14, 16.

Figure 4:
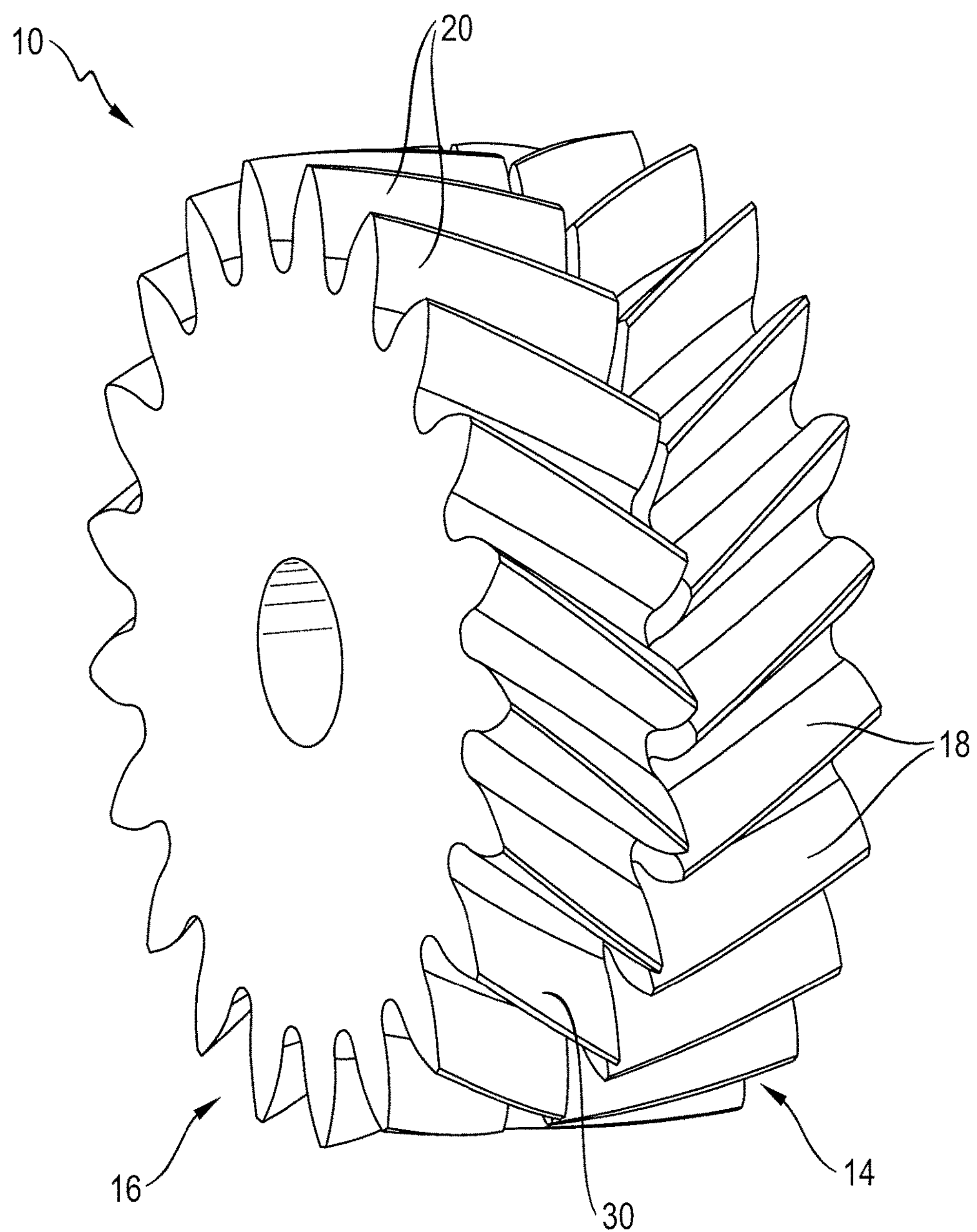
FIG. 4 shows a schematic perspective view of a second embodiment for the spur gear from FIG. 1.
Figure 5:
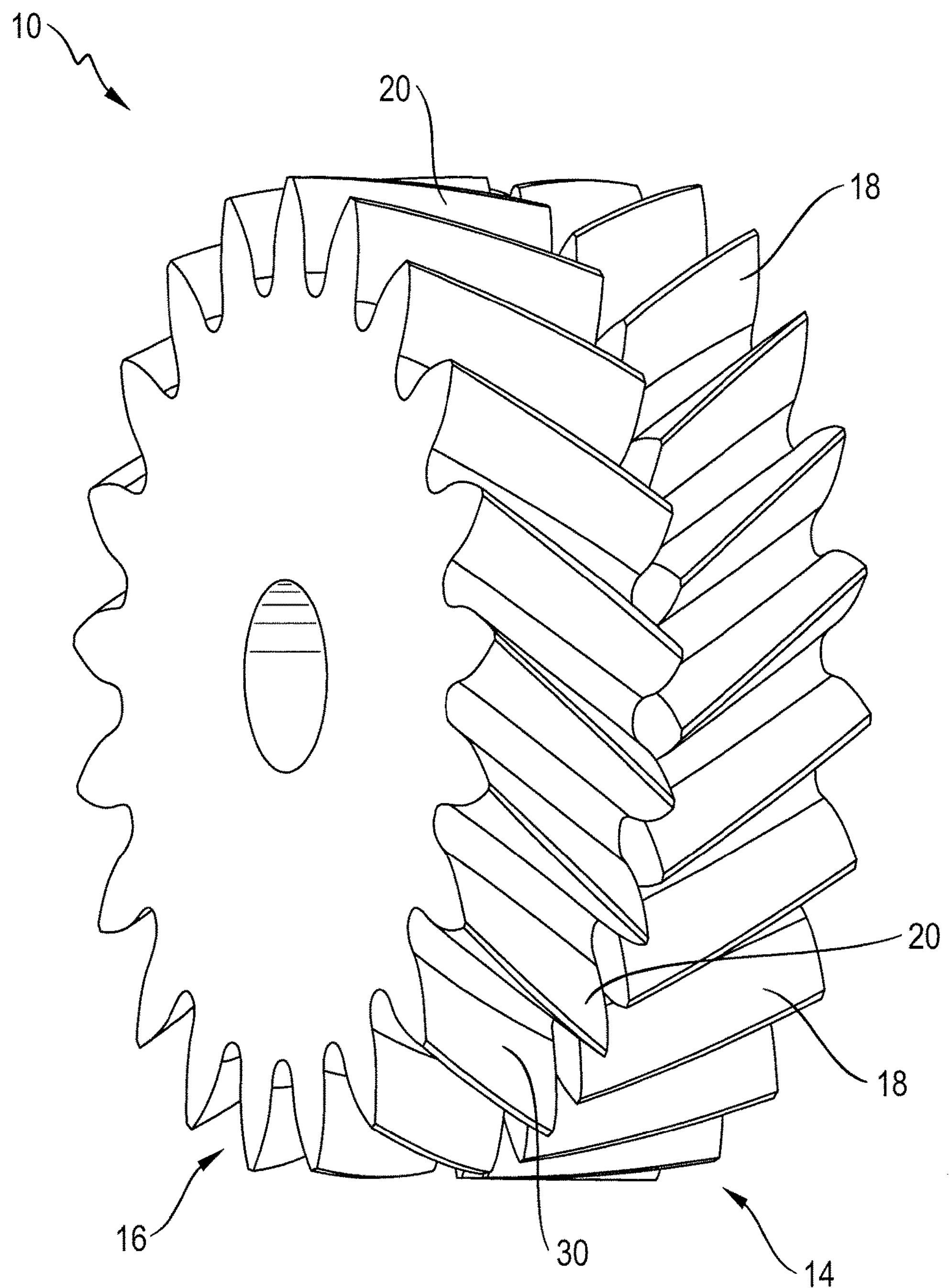
FIG. 5 shows a schematic perspective view of a third embodiment for the spur gear from FIG. 1.

In the embodiment of the spur gear 10 illustrated in FIG. 4, the first gear body 14 is rotationally offset relative to the second gear body 16 to such an extent that the first face advance $U_1$ of the first tooth 18 slightly overlaps the second face advance $U_2$ of the following second tooth 30. In the embodiment of the spur gear 10 illustrated in FIG. 5, the first gear body 14 is rotationally offset relative to the second gear body 16 yet further, giving rise to an even greater overlap between the first face advance $U_1$ of the first tooth 18 and the second face advance $U_2$ of the following second tooth 30. Here, it may even be realized that, at least radially within the pitch circle diameter, the first tooth 18 partially overlaps two second teeth 20 and the second tooth 20 partially overlaps two first teeth 18.

What is claimed is:

1. A spur gear for transmitting a drive torque in a toothing of a motor vehicle transmission, comprising:

a helically toothed first gear body (14) having first teeth (18), a second gear body (16), which is helically toothed oppositely to the first gear body (14) so as to form a herringbone toothing, having second teeth (20), wherein, on axial sides of the first gear body (14) and of the second gear body (16) which face toward one another, the first teeth (18) and the second teeth (20) point toward one another, so as to at least partially overlap one another, in each case pairwise, wherein the first gear body (14) and the second gear body (16) are offset relative to one another in the circumferential direction, wherein, at the axial sides of the first gear body (14) and of the second gear body (16) which point toward one another, the first teeth (18) and the second teeth (20) overlap one another only partially, wherein, an edge of a first tooth flank (26) of the first tooth (18) on the axial side of the first gear body (14) that faces toward the second gear body (16) is radially aligned along an imaginary axis (24) with an edge of a second tooth flank (28) of a following second tooth (30) of the second gear body (16), wherein the edge of the second tooth flank (28) is positioned on an axial side of the second gear body (16) that faces away from the first gear body (14), wherein the following second tooth (30) follows in a circumferential direction the second tooth (20) of the second gear body (16) that points toward and at least partially overlaps the first tooth (18).

2. The spur gear as claimed in claim 1, wherein a face advance $U_1$ of the first tooth (18) of the first gear body and a face advance $U_2$ of the following second tooth (30) of the second gear body overlap over a distance ε in a circumferential direction, where $0.00 \leq \varepsilon/U_2 \leq 0.20$.

3. The spur gear as claimed in claim 1, wherein the first gear body (14) or the second gear body (16) has a face contact ratio $\varepsilon_\beta$ of $\varepsilon_\beta \leq 1.00$.

4. The spur gear as claimed in claim 1, wherein, at the axial sides of the first and second gear bodies that point toward one another, the first tooth flank (26) of the first tooth (18) is offset in the circumferential direction by $V_U$ with respect to the second tooth flank (28) of the oppositely situated, partially overlapped second tooth (20), wherein, in a case of a maximum tooth thickness S in the circumferential direction of the first tooth (18) and of the second tooth (20), the following applies: $0.00 < V_U/S < 1.00$.

5. The spur gear as claimed in claim 4, wherein, at the axial sides of the first and second gear bodies that point toward one another, the first tooth flank (26) of the first tooth (18) is offset in the circumferential direction by Vu with respect to the second tooth flank (28) of the oppositely situated, partially overlapped second tooth (20), wherein, in a case of a tooth thickness s in the circumferential direction of the first tooth (18) and of the second tooth (20) at the radial height of the pitch circle diameter, the following applies: $0.00 \leq V_U/s \leq 1.00$.

6. The spur gear as claimed in claim 1, wherein the first teeth (18) have a first helix angle and the second teeth (20) have a second helix angle, wherein a magnitude of the first helix angle differs from a magnitude of the second helix angle.

7. The spur gear as claimed in claim 1, wherein the first tooth (18) has a first toothing width and the second tooth (20) has a second toothing width which differs from the first toothing width.

8. The spur gear as claimed in claim 1, further comprising a hub (12) for mounting of the spur gear (10), wherein the first gear body (14) and the second gear body (16) are connected fixedly in terms of motion to the hub (12).

9. A motor vehicle transmission for the engagement of vehicle gear speeds, the motor vehicle transmission comprising:

a spur gear including:

a helically toothed first gear body (14) having first teeth (18), a second gear body (16), which is helically toothed oppositely to the first gear body (14) so as to form a herringbone toothing, having second teeth (20), wherein, on axial sides of the first gear body (14) and of the second gear body (16) which face toward one another, the first teeth (18) and the second teeth (20)

point toward one another, so as to at least partially overlap one another, in each case pairwise, wherein the first gear body (14) and the second gear body (16) are offset relative to one another in the circumferential direction, wherein, at the axial sides of the first gear body (14) and of the second gear body (16) which point toward one another, the first teeth (18) and the second teeth (20) overlap one another only partially, wherein, an edge of a first tooth flank (26) of the first tooth (18) on the axial side of the first gear body (14) which faces toward the second gear body (16) is radially aligned along an imaginary axis (24) with an edge of a second tooth flank (28) of a following second tooth (30) of the second gear body (16), wherein the edge of the second tooth flank (28) is positioned on an axial side of the second gear body (16) that faces away from the first gear body (14), wherein the following second tooth (30) follows in a circumferential direction the second tooth (20) of the second gear body (16) that points toward and at least partially overlaps the first tooth (18).

10. The spur gear as claimed in claim 1, wherein a face advance $U_1$ of the first tooth of the first gear body and a face advance $U_2$ of the following second tooth of the second gear body overlap over a distance $\varepsilon$ in a circumferential direction, where $0.01 \leq \varepsilon/U_2 \leq 0.10$.

11. The spur gear as claimed in claim 1, wherein the first gear body or the second gear body has a face contact ratio $\varepsilon_p$ of $0.50 \leq \varepsilon_\beta < 1.00$.

12. The spur gear as claimed in claim 1, wherein, at the axial sides of the first and second gear bodies that point toward one another, the first tooth flank (26) of the first tooth (18) is offset in the circumferential direction by $V_U$ with respect to the second tooth flank (28) of the oppositely situated, partially overlapped second tooth (20), wherein, in a case of a maximum tooth thickness S in the circumferential direction of the first tooth (18) and of the second tooth (20), the following applies: $0.25 \leq V_U/S \leq 0.98$.

13. The spur gear as claimed in claim 4, wherein, at the axial sides of the first and second gear bodies that point toward one another, the first tooth flank (26) of the first tooth (18) is offset in the circumferential direction by $V_U$ with respect to the second tooth flank (28) of the oppositely situated, partially overlapped second tooth (20), wherein, in a case of a tooth thickness s in the circumferential direction of the first tooth (18) and of the second tooth (20) at the radial height of the pitch circle diameter, the following applies: $0.25 \leq V_U/s \leq 0.98$.

* * * * *